US008660734B2

United States Patent
Zhu et al.

(10) Patent No.: US 8,660,734 B2
(45) Date of Patent: Feb. 25, 2014

(54) SYSTEM AND METHOD FOR PREDICTING BEHAVIORS OF DETECTED OBJECTS

(75) Inventors: Jiajun Zhu, Sunnyvale, CA (US); David I. Ferguson, San Francisco, CA (US); Dmitri A. Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/251,705

(22) Filed: Oct. 3, 2011

(65) Prior Publication Data

US 2012/0083960 A1  Apr. 5, 2012

Related U.S. Application Data

(60) Provisional application No. 61/390,094, filed on Oct. 5, 2010, provisional application No. 61/391,271, filed on Oct. 8, 2010.

(51) Int. Cl.
*G05D 1/00* (2006.01)

(52) U.S. Cl.
USPC ......................................................... 701/23

(58) Field of Classification Search
USPC ......................................................... 701/23
See application file for complete search history.

(56) References Cited

U.S. PATENT DOCUMENTS

| | | |
|---|---|---|
| 1,924,984 A | 8/1933 | Fageol |
| 3,186,508 A | 6/1965 | Lamont |
| 3,324,805 A | 6/1967 | Mulch |
| 3,596,728 A | 8/1971 | Neville |
| 4,372,414 A | 2/1983 | Anderson et al. |
| 4,387,783 A | 6/1983 | Carman |
| 4,656,834 A | 4/1987 | Elpern |
| 4,924,795 A | 5/1990 | Ottemann |
| 4,982,072 A | 1/1991 | Takigami |
| 5,187,666 A | 2/1993 | Watanabe |
| 5,415,468 A | 5/1995 | Latarnik et al. |
| 5,448,487 A | 9/1995 | Arai |
| 5,470,134 A | 11/1995 | Toepfer et al. |
| 5,684,696 A | 11/1997 | Rao et al. |
| 5,774,069 A | 6/1998 | Tanaka et al. |
| 5,906,645 A | 5/1999 | Kagawa et al. |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |

(Continued)

FOREIGN PATENT DOCUMENTS

| | | |
|---|---|---|
| EP | 2216225 A1 | 8/2010 |
| JP | 09-160643 A | 6/1997 |

(Continued)

OTHER PUBLICATIONS

International Search Report and the Written Opinion for Application No. PCT/US 2011/054154, Apr. 24, 2012.

(Continued)

*Primary Examiner* — Thomas Tarcza
*Assistant Examiner* — Alex C Dunn
(74) *Attorney, Agent, or Firm* — Lerner, David, Littenberg, Krumholz & Mentlik, LLP

(57) ABSTRACT

Aspects of the invention relate generally to autonomous vehicles. Specifically, the features described may be used alone or in combination in order to improve the safety, use, driver experience, and performance of these vehicles.

23 Claims, 9 Drawing Sheets

(56) References Cited

U.S. PATENT DOCUMENTS

| | | |
|---|---|---|
| 6,321,147 B1 | 11/2001 | Takeda et al. |
| 6,332,354 B1 | 12/2001 | Lalor et al. |
| 6,343,247 B2 | 1/2002 | Jitsukata et al. |
| 6,438,472 B1 | 8/2002 | Tano et al. |
| 6,438,491 B1 | 8/2002 | Farmer |
| 6,470,874 B1 | 10/2002 | Mertes |
| 6,504,259 B1 | 1/2003 | Kuroda et al. |
| 6,516,262 B2 | 2/2003 | Takenaga et al. |
| 6,591,172 B2 | 7/2003 | Oda et al. |
| 6,643,576 B1 | 11/2003 | O Connor et al. |
| 6,832,156 B2 | 12/2004 | Farmer |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 7,011,186 B2 | 3/2006 | Frentz et al. |
| 7,031,829 B2 | 4/2006 | Nisiyama |
| 7,102,496 B1 | 9/2006 | Ernst, Jr. et al. |
| 7,194,347 B2 | 3/2007 | Harumoto et al. |
| 7,207,304 B2 | 4/2007 | Iwatsuki et al. |
| 7,233,861 B2 | 6/2007 | Van Buer et al. |
| 7,327,242 B2 | 2/2008 | Holloway et al. |
| 7,346,439 B2 | 3/2008 | Bodin |
| 7,394,046 B2 * | 7/2008 | Olsson et al. ................. 244/3.1 |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,579,942 B2 * | 8/2009 | Kalik ......................... 340/435 |
| 7,656,280 B2 | 2/2010 | Hines et al. |
| 7,694,555 B2 | 4/2010 | Howell et al. |
| 7,865,277 B1 | 1/2011 | Larson et al. |
| 7,908,040 B2 * | 3/2011 | Howard et al. .................. 701/1 |
| 7,956,730 B2 | 6/2011 | White et al. |
| 8,050,863 B2 | 11/2011 | Trepagnier et al. |
| 8,078,349 B1 | 12/2011 | Prada Gomez et al. |
| 8,190,322 B2 | 5/2012 | Lin et al. |
| 8,195,341 B2 | 6/2012 | Huang et al. |
| 8,244,408 B2 * | 8/2012 | Lee et al. ..................... 700/301 |
| 8,260,515 B2 | 9/2012 | Huang et al. |
| 8,280,601 B2 | 10/2012 | Huang et al. |
| 2001/0037927 A1 | 11/2001 | Nagler et al. |
| 2003/0016804 A1 | 1/2003 | Sheha et al. |
| 2003/0055554 A1 | 3/2003 | Shioda et al. |
| 2003/0093209 A1 | 5/2003 | Andersson et al. |
| 2004/0243292 A1 | 12/2004 | Roy |
| 2005/0012589 A1 | 1/2005 | Kokubu et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0178240 A1 | 8/2006 | Hansel |
| 2006/0276942 A1 | 12/2006 | Anderson et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0059048 A1 | 3/2008 | Kessler et al. |
| 2008/0084283 A1 * | 4/2008 | Kalik ......................... 340/435 |
| 2008/0120025 A1 | 5/2008 | Naitou et al. |
| 2008/0147253 A1 | 6/2008 | Breed |
| 2008/0161987 A1 | 7/2008 | Breed |
| 2008/0183512 A1 | 7/2008 | Benzinger et al. |
| 2008/0188246 A1 | 8/2008 | Sheha et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0082879 A1 | 3/2009 | Dooley et al. |
| 2009/0115594 A1 | 5/2009 | Han |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0076640 A1 | 3/2010 | Maekawa et al. |
| 2010/0179720 A1 | 7/2010 | Lin et al. |
| 2010/0205132 A1 | 8/2010 | Taguchi |
| 2010/0228419 A1 * | 9/2010 | Lee et al. ......................... 701/25 |
| 2010/0241297 A1 | 9/2010 | Aoki et al. |
| 2010/0256836 A1 | 10/2010 | Mudalige |
| 2011/0071718 A1 | 3/2011 | Norris et al. |
| 2011/0137520 A1 | 6/2011 | Rector et al. |
| 2011/0254655 A1 | 10/2011 | Maalouf et al. |
| 2012/0053775 A1 | 3/2012 | Nettleton et al. |
| 2012/0157052 A1 | 6/2012 | Quade |
| 2012/0277947 A1 | 11/2012 | Boehringer et al. |

FOREIGN PATENT DOCUMENTS

| | | |
|---|---|---|
| JP | 11282530 A | 10/1999 |
| JP | 2000149188 A | 5/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2005067483 A | 3/2005 |
| JP | 2005071114 A | 3/2005 |
| JP | 2005-339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 | 11/2001 |
| WO | 2009028558 A1 | 3/2009 |
| WO | 2011021046 A1 | 2/2011 |

OTHER PUBLICATIONS

International Search Report and Written Opinion for Application No. PCT/UC2011/054899 dated May 4, 2012.

International Search Report and the Written Opinion for Application No. PCT/US 2011/054896, Apr. 25, 2012.

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

* cited by examiner

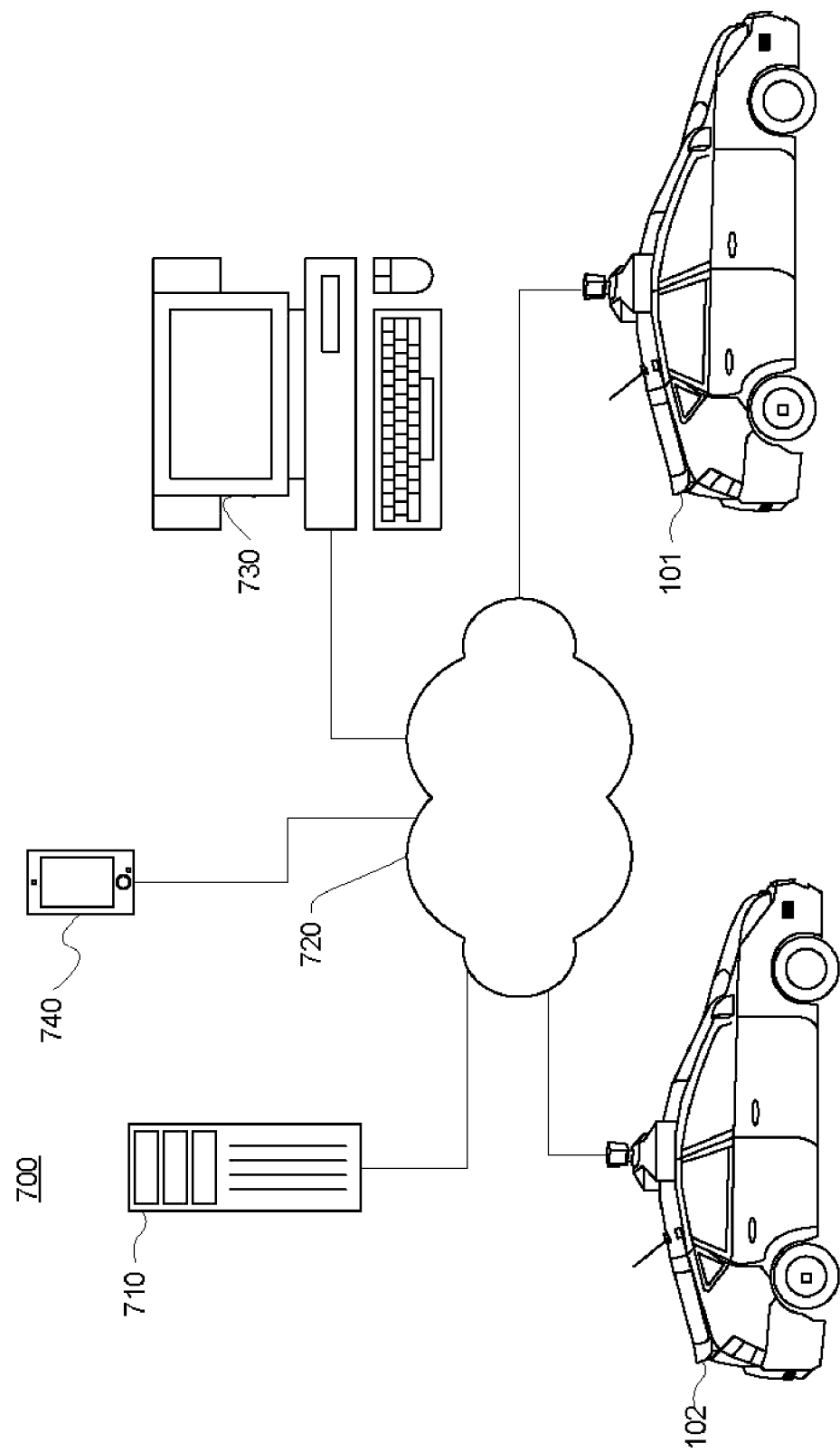

SYSTEM AND METHOD FOR PREDICTING BEHAVIORS OF DETECTED OBJECTS

CROSS-REFERENCE TO RELATED APPLICATIONS

The present application claims the benefit of the filing dates of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

Autonomous vehicles use various computing systems to aid in the transport passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

BRIEF SUMMARY

In various aspects, the invention provides a vehicle having a steering device (e.g., wheels that turn in the case of an automobile and a rudder in the case of a boat) and engine. The steering device may be controlled by a first user input controller (e.g., a steering wheel in the cockpit of a car), the engine may be controlled by a second user input controller (e.g., accelerator in the case of a car or a throttle in the case of boat), and both the engine and device may be controlled by a processor capable of executing computer instructions. The vehicle include one or more sensors (e.g., cameras, radar, laser range finders) for capturing information relating to the environment in which the vehicle is operating. The processor receives data from the sensors and, based in part on data from the sensors or received from external sources or both, issues a navigation command, where a navigations command comprises a command to the steering device relating to the intended direction of the vehicle (e.g., a command to turn the front wheels of a car 10 degrees to the left) or to the engine relating to the intended velocity of the vehicle (e.g., a command to accelerate). Navigation commands may also include commands to brakes to slow the vehicle down, as well as other commands affecting the movement of the vehicle.

In one aspect, sensors are used to detect an object external to the vehicle, and data corresponding to the object is sent to a processor. The processor analyzes the data corresponding to the object to determine the classification and the state of the object. The processor then predicts the likely behavior of the object by accessing behavior data for entities having a classification and state similar to the object. The vehicle may then orient itself in an intended position and velocity based at least in part on the likely behavior of the object.

In another aspect, the classification of the object external to the vehicle includes classifying the object as an automobile, a pedestrian, or a bicycle. In addition, the object may be further classified such as by determining the type of automobile, or by classifying the object based on a logo, bumper sticker, or license plate.

In yet another aspect, the state of the object external to the vehicle relates to at least one of: location, traffic lane in which the object is traveling, speed, acceleration, entry onto a road, exit off of a road, activation of headlights, activation of taillights, or activation of blinkers.

In still another aspect, the behavior data is collected by tracking the states of numerous entities at one or more locations. This tracking may be performed by satellite imagery, roadside cameras, on-board GPS data, or via sensor data acquired from other nearby entities.

In another aspect, the command to orient the vehicle may include positioning the vehicle at a predetermined distance from the object, the predetermined distance being based at least in part on the classification of the object. In addition, the likely behavior of the object may be provided as a probability of the object entering to one or more states.

In still another aspect, the vehicle receives updated behavior data, for example, from a remote server. The vehicle may then be autonomously controlled based, at least in part, on the updated behavior data.

BRIEF DESCRIPTION OF THE FIGURES

FIG. 7 is a function diagram of a system in accordance with an aspect of the invention.

DETAILED DESCRIPTION

Aspects of the disclosure relate generally to an autonomous driving system. In particular, a vehicle implementing the autonomous driving system is capable of detecting and reacting to surrounding objects. Some of the detected objects will be mobile, such as pedestrians, automobiles, and bicycles. As set forth below, the autonomous driving system is able to identify and classify nearby objects. In addition, based on the object's classification, the autonomous driving system may predict the object's likely movements and behavior. In turn, the vehicle may react to nearby objects in a way that decreases the likelihood of an accident and increases the efficiency of travel.

Figure 1:
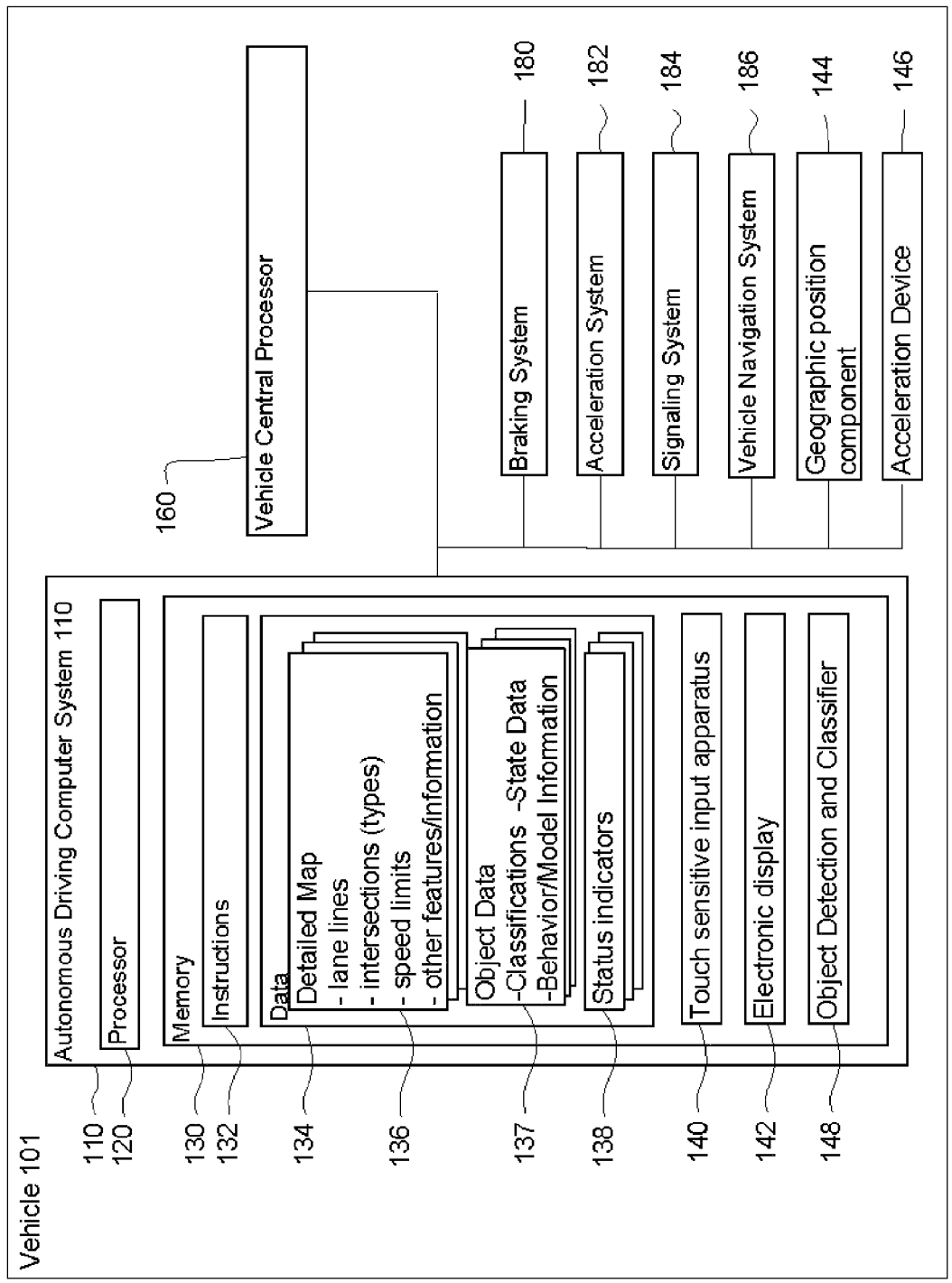
FIG. 1 is a functional diagram of a system in accordance with an aspect of the invention.

As shown in FIG. 1, an autonomous driving system 100 in accordance with one aspect of the invention includes a vehicle 101 with various components. While certain aspects of the invention are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer, such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Computer 110 may also control status indicators 138, in order to convey the status of the vehicle and its components to a passenger of vehicle 101. For example, vehicle 101 may be equipped with a display 225 for displaying information relating to the overall status of the vehicle, particular sensors, or computer 110 in particular. The display 225 may include computer generated images of the vehicle's surroundings including, for example, the status of the computer (cruise), the vehicle itself 410, roadways 420, intersections 430, as well as other objects and information.

Figure 2:
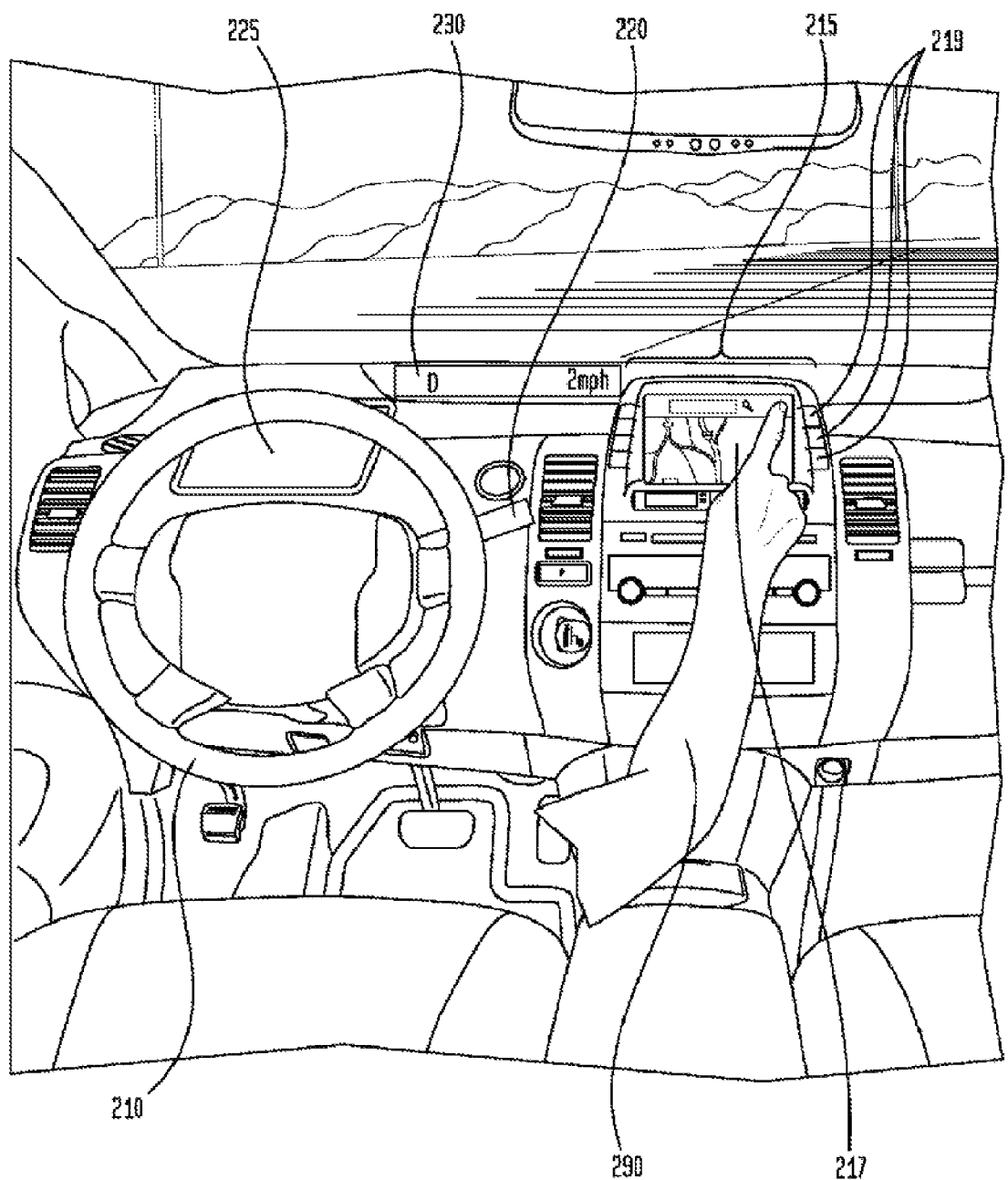
FIG. 2 is an exemplary design of the interior of an autonomous vehicle in accordance with an aspect of the invention.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

The vehicle may include components for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors allow the vehicle to understand and potentially respond to its environment in order to maximize safety for passengers as well as objects or people in the environment.

In addition to the sensors described above, the computer may also use input from sensors typical non-autonomous vehicles. For example, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3:
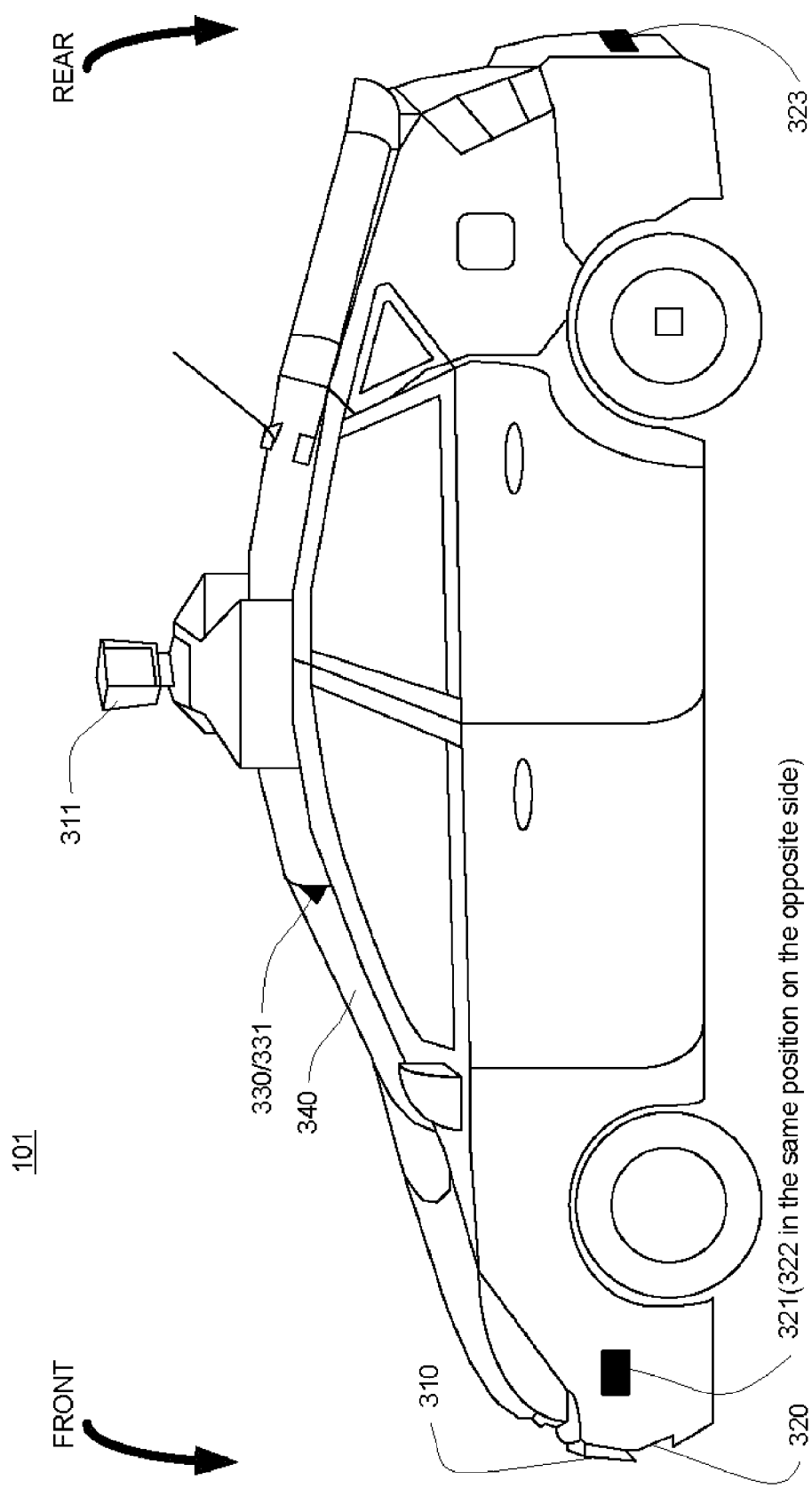
FIG. 3 is a view of the exterior of an exemplary vehicle in accordance with an aspect of the invention.

FIG. 3 illustrates a particular embodiment for a small passenger vehicle 301 that includes lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
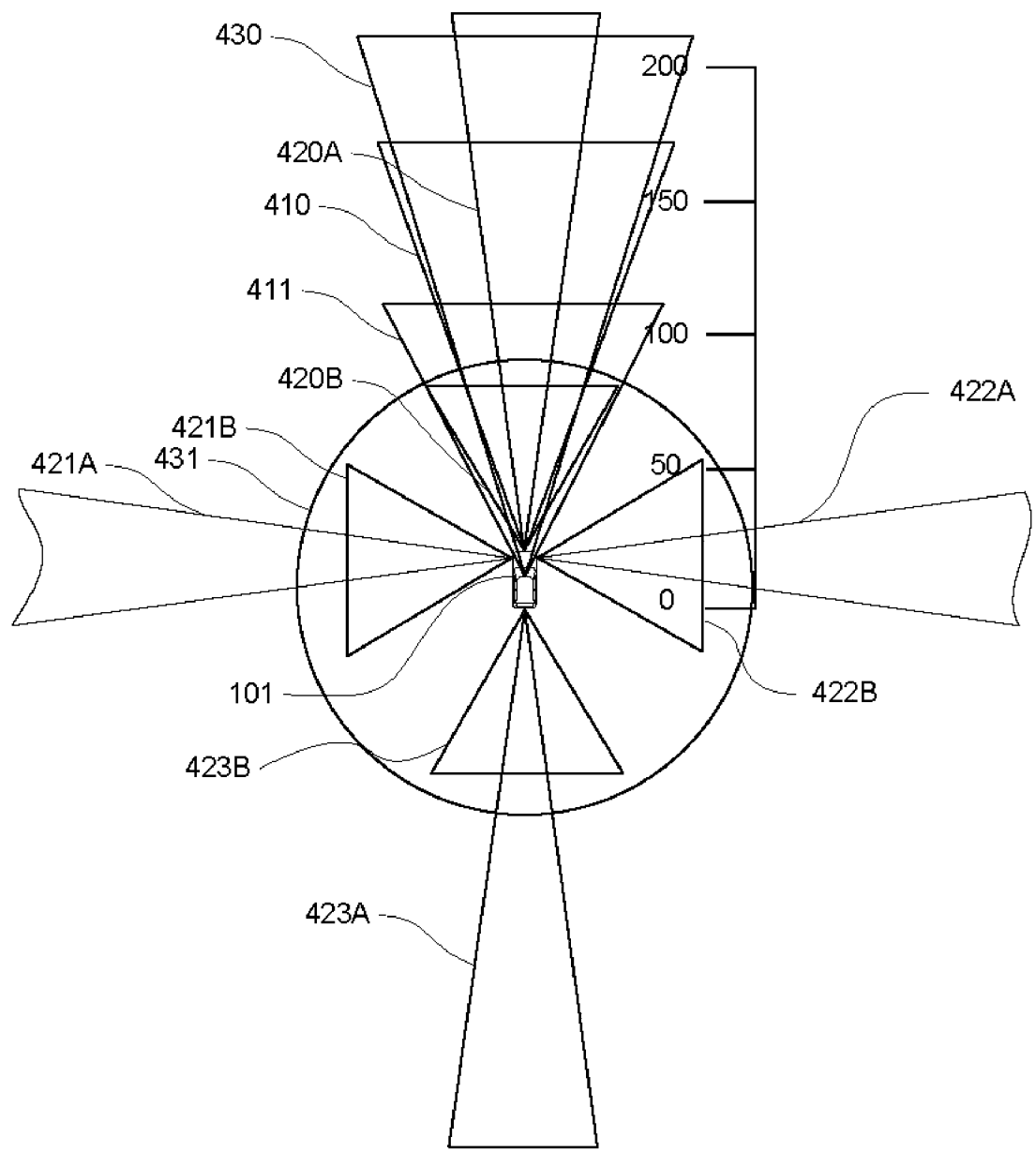
FIGS. 4A-4D are views of the sensor fields for an autonomous vehicle.

Each sensor may be associated with a particular sensor field in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 150 meters, and sensor field 411 includes a 360 degree horizontal field of view for approximately 80 meters.

Figure 4C:
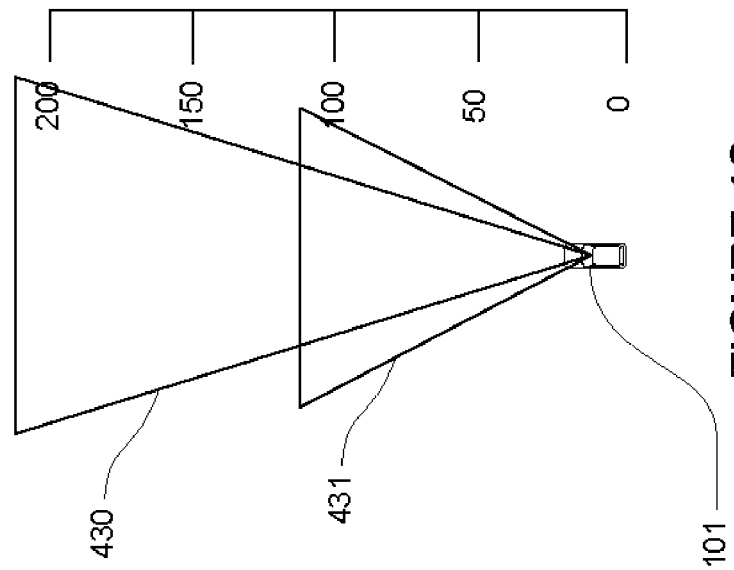
Figure 4B:
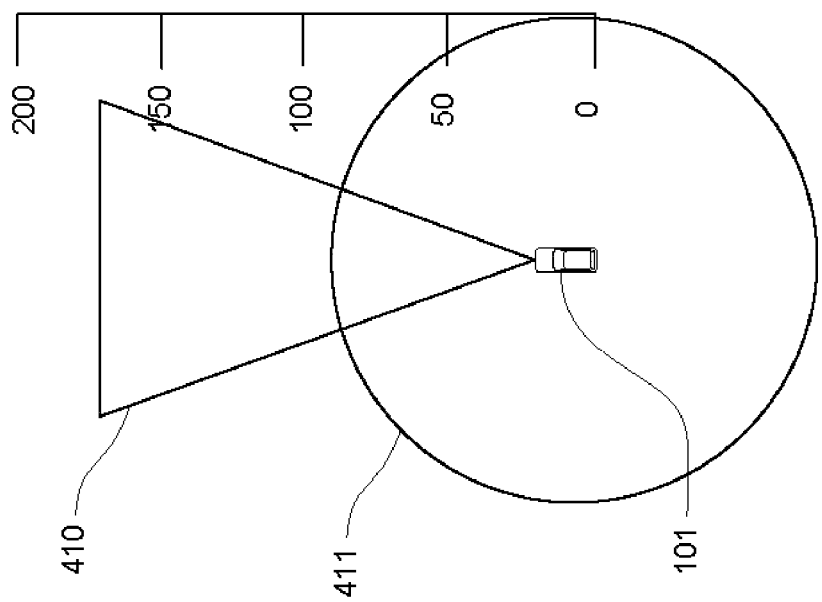
Figure 4D:
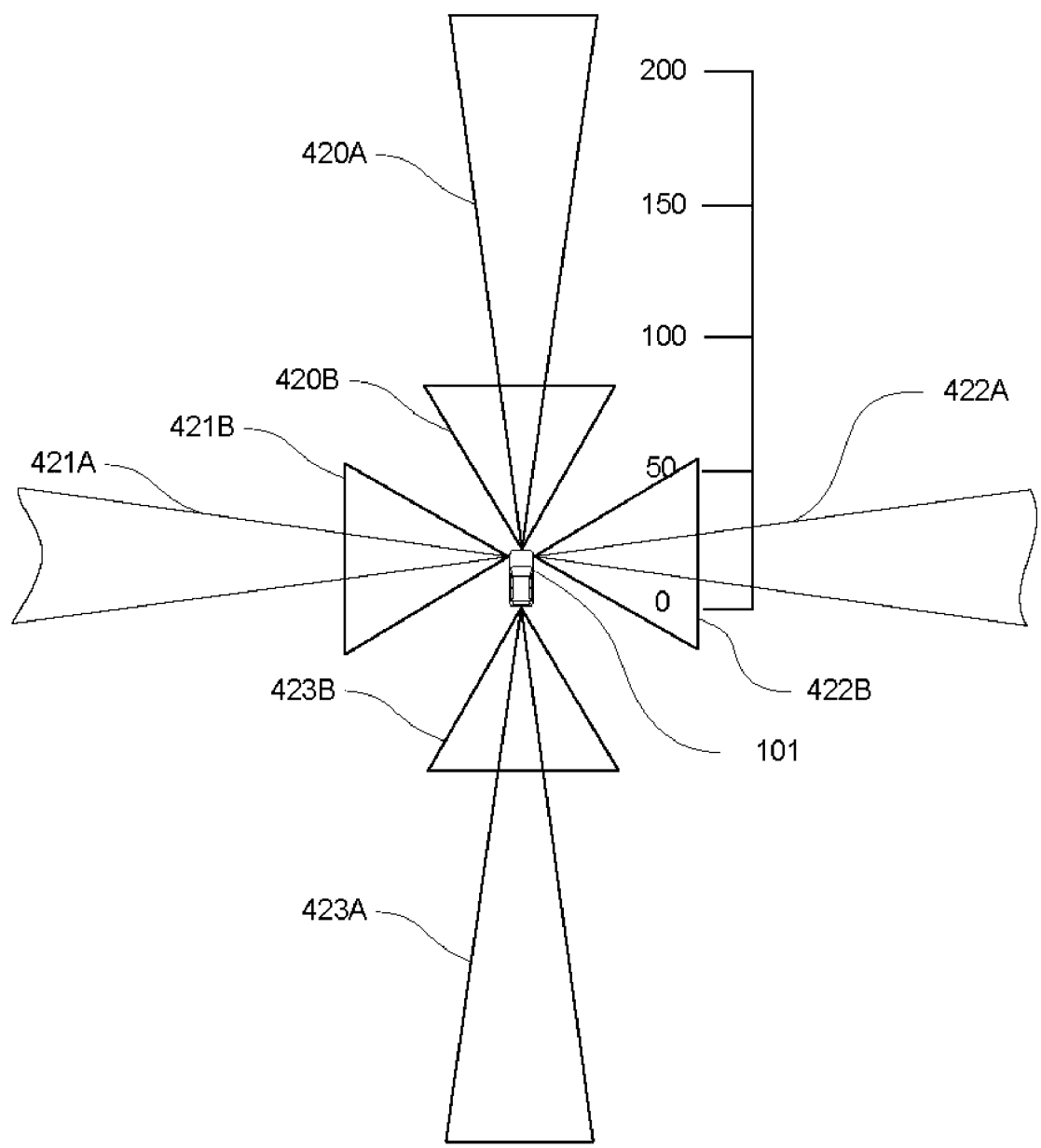

FIG. 4D depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4D.

FIG. 4C depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In another example, an autonomous vehicle may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters.

The sensors described may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector) or by the computer 110 based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Yet further, if the computer determines that an object is obstructing the intended path of the vehicle, it may maneuver the vehicle around the obstruction.

Yet further, the vehicle's computer system may predict a detected object's expected movement. In one aspect, the computer system 110 may simply predict the object's future movement based solely on the object's instant direction, acceleration/deceleration and velocity, e.g., that the object's current direction and movement will continue.

Once an object is detected, the system may determine the type of the object, for example, a traffic cone, person, car, truck or bicycle, and use this information to predict the object's future behavior. Objects may be identified by using an object classifier 148 which may consider various characteristics of the detected objects, such as the size of an object (bicycles are larger than a breadbox and smaller than a car), the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

In some examples, objects identified by the vehicle may not actually require the vehicle to alter its course. For example, if there were a sand storm, the vehicle may detect the sand as one or many objects, but need not alter its trajectory, though it may slow or stop itself for safety reasons.

In another example, the scene external to the vehicle need not be segmented from input of the various sensors and nor do objects need to be classified for the vehicle to take a responsive action. Rather the vehicle may take one or more actions based on the color and/or shape of an object.

The system may also rely on information that is independent of the detected object's movement to predict the object's next action. By way of example, if the vehicle determines that another object is a bicycle that is beginning to ascend a steep hill in front of the vehicle, the computer may predict that the bicycle will soon slow down—and will slow the vehicle down accordingly—regardless of whether the bicycle is currently traveling at a somewhat high speed.

It will be understood that the forgoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that the other car is turning at the next intersection as noted above, the computer may slow the vehicle down as it approaches the intersection. In this regard, the predicted behavior of other objects is based not only on the type of object and its current trajectory, but also based on some likelihood that the object may obey traffic rules or pre-determined behaviors. In another example, the system may include a library of rules about what objects will do in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human built set of rules which may be improved by the vehicle's observations. Similarly, the library may begin as rules learned from vehicle observation and have humans examine the rules and improve them manually. This observation and learning may be accomplished by, for example, tools and techniques of machine learning. The rules library may be included in computer 110 or may alternatively be accessible to the vehicle 101 via a remote server, such as server 710 of FIG. 7.

In addition to processing data provided by the various sensors, the computer may rely on environmental data that was obtained at a previous point in time and is expected to persist regardless of the vehicle's presence in the environment. For example, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

The computer 110 may also access data 134 relating to certain types of objects that the vehicle 101 may encounter. As described above, the sensors of vehicle 101 may be used to identify, track and predict the movements of pedestrians, bicycles, vehicles, or other objects in or around the roadway. These objects may have particular behavior patterns that depend on the nature of the object. For example, a bicycle is likely to react differently than a tractor-trailer in a number of ways. Specifically, a bicycle is more likely to make erratic movements when compared with a tractor-trailer. Accordingly, in predicting an objects behavior, computer 110 may access object data 137 that contains numerous object classifications, such as pedestrians, bicycles, cars, tractor-trailers, etc. For each classification, the object data 137 may also contain behavior information that indicates how an object having a particular classification is likely to behave in a given situation. Vehicle 101 may then autonomously respond to the object based, in part, on the predicted behavior.

In addition to classifying the object, vehicle 101 may track a current state of the object. The object's state may include information used to determine the object's classification, but any type of environmental or contextual information may be used to determine the object's current state, such as the object's speed, route the object has traveled, nature of the roadway on which the object is traveling, any lane changes made by the object, or the object's use of headlights or blinkers.

Figure 5A:
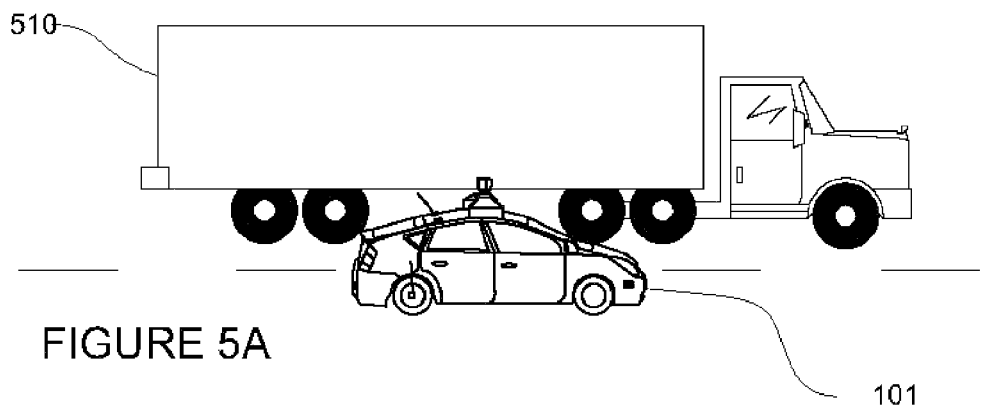
FIGS. 5A and 5B are views of an autonomous vehicle in proximity to an external object.
Figure 5B:
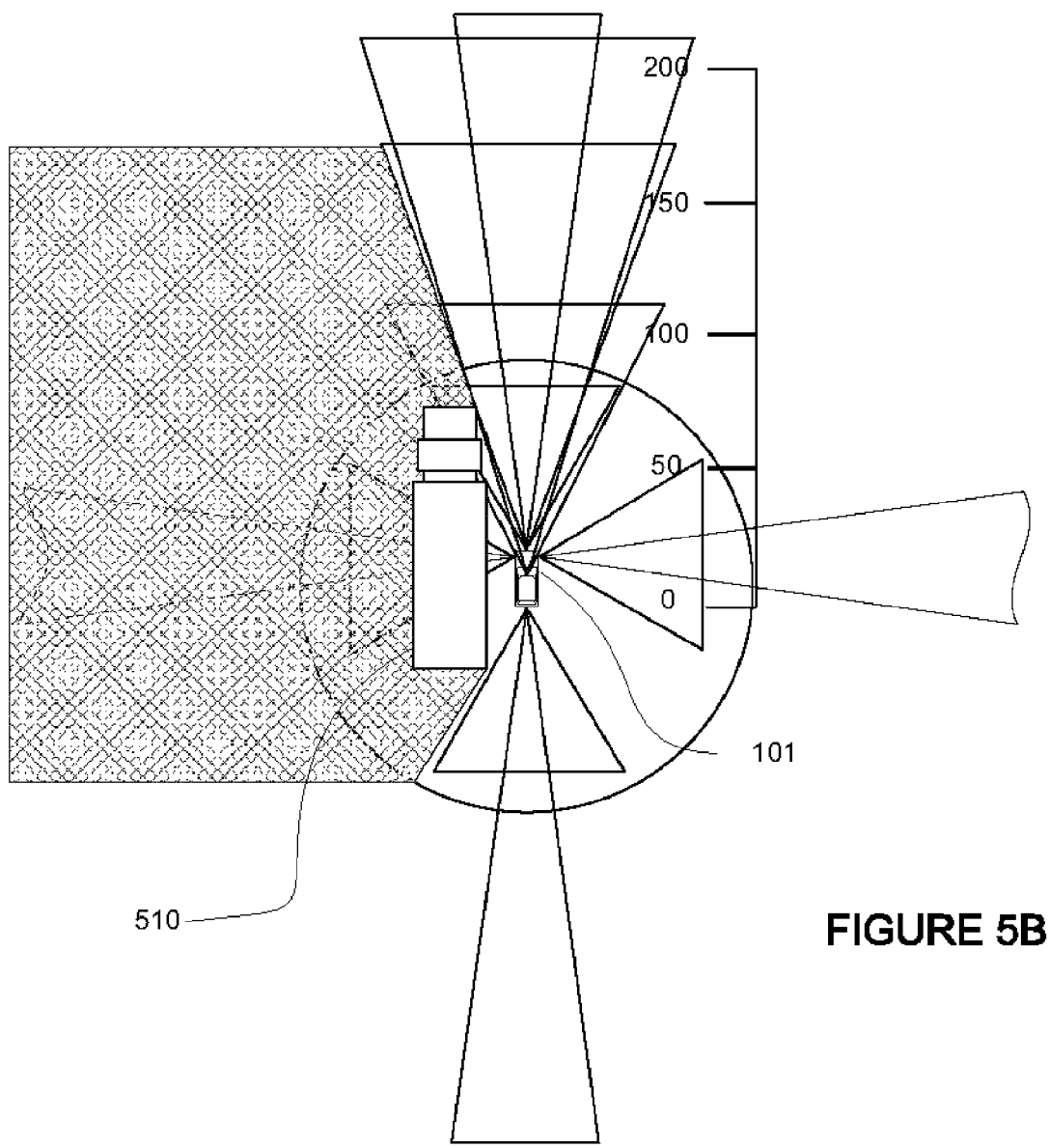

For example, FIGS. 5A and 5B depict vehicle 101 as driving along side a tractor-trailer 510. As provided in FIG. 5B, the tractor-trailer 510 is within range of several sensor fields of vehicle 101. Using the data collected from the sensors of vehicle 101, computer 110 of FIG. 1 may identify object 510 as being a tractor-trailer. In addition, computer 110 may determine the state of tractor-trailer 510. For example, data collected from the sensors of vehicle 101 may be used to determine that the tractor-trailer is traveling at 55 miles per hour in the left-hand lane of the interstate.

Once the computer 110 has determined the tractor-trailer's classification and state information, it may then access behavior information for objects having the same, or similar, classifications and states. Behavior information is a collection of data relating to how various objects act in particular contexts. For example, all of vehicles traveling along a particular roadway over period of time could be observed and their movements tracked. These tracked movements could then be stored and a model may be created that indicates how future vehicles may act when traveling along that particular roadway. Upon storing the tracked movement, the vehicle's classification could be stored along with it. In this way, the modeled behavior may not only relate to all objects generally, but may also relate to a specific classification of vehicle. For example, the behavior information could indicate that all vehicles entering a highway via a particular on-ramp do not usually take the next available exit from the highway. In addition, the tracked movements of the vehicles could indicate that the vehicles classified as tractor-trailers are much more likely to change over to the right-hand lane, or to take a particular highway exit than cars. If the upcoming exit is a weighing station, the tractor-trailers might only take that exit during particular days of the week or during a particular time of day. This information could also be accessed in connection with the tracked vehicle movements. Accordingly, once data has been collected for the traveling along a particular route, predictions can be made as to what a particular vehicle will do in the future.

The collection of data for vehicle or pedestrian movements may be accomplished in any number of ways. For example, the movement of vehicles may be tracked using satellite imagery, roadside cameras, on board GPS data, or via sensor data acquired from vehicles similar to vehicle 101. Preferably, the behavior model will be based on a large number of tracked objects for each classification of object. In this way, an accurate behavior model can be created for each classification of objects.

Figure 6:
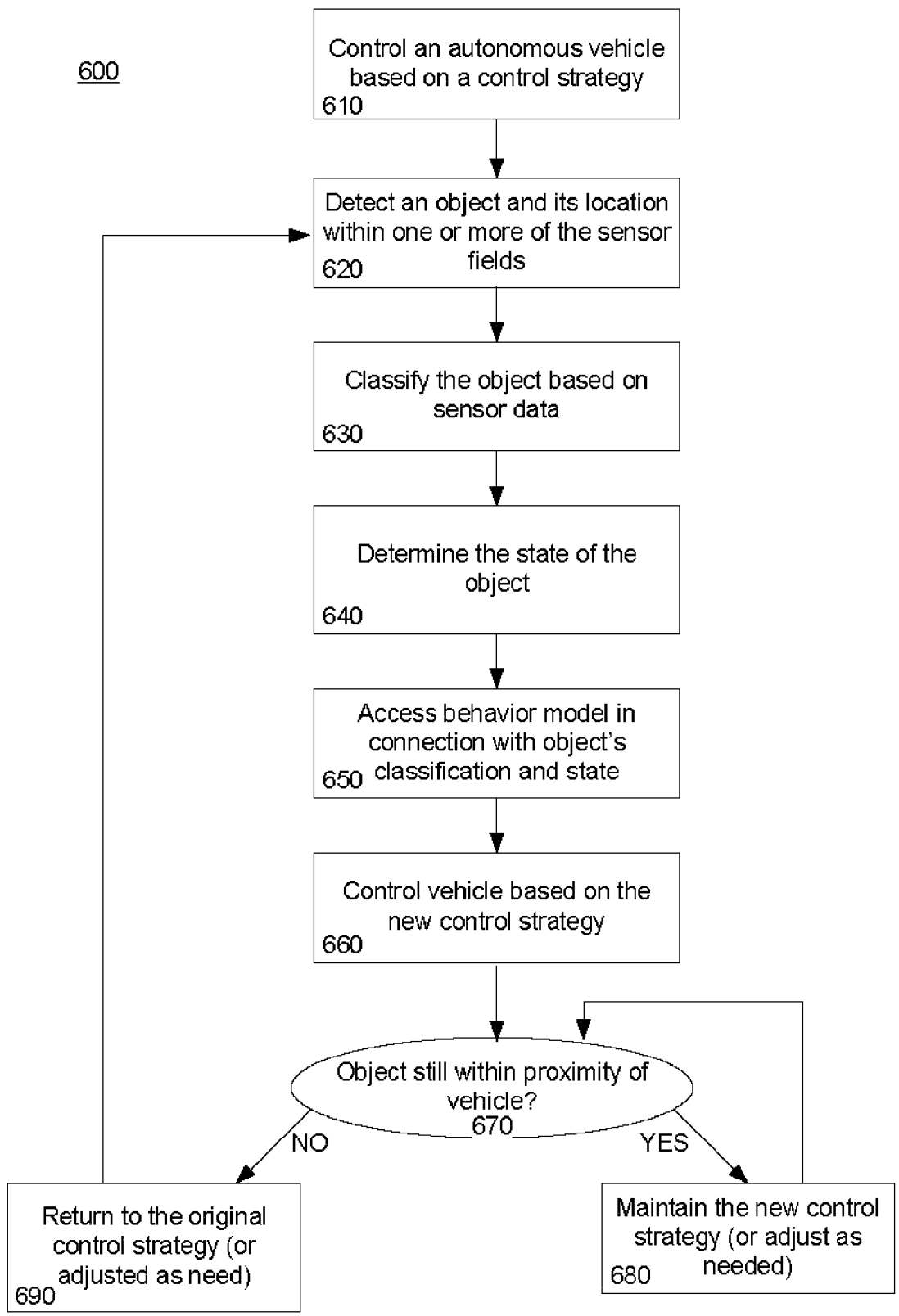
FIG. 6 is a flow diagram in accordance with an aspect of the invention.

Flow diagram 600 of FIG. 6 provides an example by which vehicle 101 may be autonomously controlled in response to predicted behaviors of surrounding objects. Autonomous vehicle 101 may transport itself, passengers, and/or cargo between two locations by following a route. For example, a driver may input a destination and activate an autonomous mode of the vehicle. In response, the vehicle's computer 110 may calculate a route using a map, its current location, and the destination. Based on the route (or as part of the route generation), the vehicle may determine a control strategy for controlling the vehicle along the route to the destination. For example, the control strategy may include where to turn, at what speeds to travel, what lane to travel in, where to look for traffic signals, where to stop for intersections or stop signs, etc. Vehicle 101 implements the determined control strategy by traveling to travel along the route (Block 610). While traveling in accordance with the control strategy, vehicle 101 may detect the presence of an object within one or more of the vehicle's sensor fields (Block 620). Upon detecting the object, the vehicle's computer 110 may classify the object based on the data received by the vehicle's sensors (Block 630). For example, the sensor data could be used to classify objects as being a pedestrian, bicycle, sports car, pick-up truck, etc. As described above, the vehicle's computer 110 also uses the sensor data to determine the object's state, such as speed and lane position. (Block 640). Upon determining the objects classification and state, computer 110 accesses behavior model information contained in database 137 (Block 650). Specifically, the computer 110 may access likely behavior patterns for objects having a similar classification and state. Based on the behavior model data, the computer 110 may implement a new or supplemental control strategy, for example, by keeping a greater distance from a certain classification of vehicles when they are traveling in particular lanes of traffic or at some particular speed (Block 660). The computer 110 may use the sensor data to continue to track the object's proximity to vehicle 101 (Block 670). If the object remains within a predefined distance of vehicle 101, such as between 0 to 200 meters, then computer 110 may maintain the new control strategy (Block 680). The new control strategy may be adjusted, however, as both vehicle 101 and the detected object change states (e.g., change speed or location). If the object is no longer in proximity to vehicle 101, computer 110 may return to the original control strategy, making adjustments based on other changes to the vehicle's state (Block 690).

By implementing aspects of flow diagram 600, vehicle 101 will be able to autonomously react to surrounding vehicles or pedestrians in a way that minimizes the risk of accidents or other unwanted events. For example, as described above, vehicle 101 may be autonomously driving along a particular section of highway and may classify vehicle 510 as a tractor-trailer that is traveling in the left-hand lane at 55 miles per hour. In implementing flow diagram 600, vehicle 101 may access the behavior model for tractor-trailers traveling in the left-hand lane at that section of highway. The behavior model information may indicate that most tractor-trailers change to the right-hand lane while traveling along that section of the highway. Accordingly, there is a high probability of the tractor-trailer changing to the right-hand lane in the near future. Vehicle 101 could then implement a new control strategy in response to the accessed behavior model. For example, the new control strategy could change the speed of vehicle 101, so as to avoid being directly to the right of tractor-trailer 510. Alternatively, the new control strategy could cause the vehicle 101 to change lanes or to stay a particular distance from the tractor-trailer. In this way, the risk of the tractor-trailer 510 inadvertently making contact with vehicle 101 will be reduced. The new control strategy is therefore specific to the predicted behavior of tractor-trailer 510, in that a different behavior model and a different control strategy would be used if object 510 was a motorcycle or sports car.

Vehicle 101 may include one or more user input devices that enable a user to provide information to the autonomous driving computer 110. For example, a user, such as passenger 290, may input a destination (e.g., 123 Oak Street) into the navigation system using touch screen 217 or button inputs 219. In another example, a user may input a destination by identifying the destination. In that regard, the computer system may extract the destination from a user's spoken command (e.g., by stating or inputting "De young museum" as in the example of FIGS. 2 and 3).

The vehicle may also have various user input devices for activating or deactivating one or more autonomous driving modes. In some examples, the driver may take control of the vehicle from the computer system by turning the steering wheel, pressing the acceleration or deceleration pedals. The vehicle may further include a large emergency button that discontinues all or nearly all of the computer's decision-making control relating to the car's velocity or direction. In another example, the vehicle's shift knob may be used to activate, adjust, or deactivate these autonomous modes.

Computer 110 may include, or be capable of receiving information from, one or more touch sensitive input apparatuses 140. For example, computer 110 may receive input from a user input apparatus and use this information to determine whether a passenger is in contact with, such as by holding or bumping, a particular portion of vehicle 110. The touch sensitive input apparatuses may be any touch sensitive input device capable of identifying a force, for example a force resistance tape may be calibrated to accept or identify a threshold pressure input (such as 10 grams of pressure) or a range of pressures (such as 5-20 grams of pressure).

Again, these inputs may be understood by the computer as commands by the user to, for example, enter into or exit from one or more autonomous driving modes. For example, if the vehicle is being operated in an autonomous mode and the driver bumps the steering wheel, if the force is above the threshold input, the vehicle may go from an autonomous mode to a semi-autonomous mode where the driver has control of at least the steering.

The various systems described above may be used by the computer to operate the vehicle and maneuver from one location to another. For example, a user may enter destination information into the navigation, either manually or audibly. The vehicle may determine its location to a few inches based on a combination of the GPS receiver data, the sensor data, as well as the detailed map information. In response, the navigation system may generate a route between the present location of the vehicle and the destination.

When the driver is ready to relinquish some level of control to the autonomous driving computer, the user may arm the computer. The computer may be armed, for example, by pressing a button or by manipulating a lever such as gear shifter 220. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. It will be understood that the driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signaling turns or changing lanes. Once the vehicle has arrived at the destination, the vehicle may provide audible or visual cues to the driver. For example, by displaying "You have arrived" on one or more of the electronic displays.

In one aspect, the features described above may be used in combination with larger vehicles such as trucks, tractor trailers, or passenger busses. For such vehicles, the system may consider additional information when computing how to control the vehicle safely. For example, the physical attributes of a tractor trailer, such as its articulation and changing weight, may cause it to maneuver very differently than smaller passenger cars. Larger vehicles may require wider turns or different levels of acceleration and braking in order to avoid collisions and maneuver safely. The computer may consider the geometry of the vehicle when calculating and executing maneuvers such as lane changes or evasive actions.

The vehicle may be only partially autonomous. For example, the driver may select to control one or more of the following: steering, acceleration, braking, and emergency braking.

The vehicle may also address driver impairment. For example, if a driver has been unresponsive, has reduced cognitive abilities, or has been detected as having fallen asleep, the vehicle may attempt to wake or otherwise prompt the driver to respond. By way of example only, a camera capturing the driver's face may be used to determine whether the driver's eyes have remained closed for an extended period of time. If the driver remains unresponsive, the computer may cause the vehicle slow, stop or pull over to a safe location, or may assume control over the vehicle's direction or speed to avoid a collision.

In another example, the system may be always on with the driver primarily in control of the vehicle, but only intervene and take action when the vehicle detects that there is an emergency situation. For example, if a thick fog reduces the visibility of the driver, the vehicle may use its sensors to detect the presence of objects in the vehicle's path. If the vehicle determines that a collision is imminent yet the driver has taken no action to avoid the collision, the vehicle may provide the driver with a warning and, absent further correction by the driver, take one or more evasive actions such as slowing, stopping or turning the vehicle.

The vehicle may also improve driver performance while the vehicle is under the control of a driver. For example, if a driver fails to maintain the vehicle's position within a lane without using a turn signal, the vehicle may slightly adjust the steering in order to smooth out the vehicle's movements and maintain the vehicle's position within the lane. Thus, the vehicle may mitigate the likelihood of undesirable swerving and erratic driving. In another embodiment, if a driver is on a course to change lanes but has not activated the turn signal, the vehicle may automatically activate the turn signal based on the detected course of the vehicle.

The vehicle may require a driver to identify him or herself before beginning operation of the vehicle or taking some action. For example, the user may have to enter a user name and password upon entering the vehicle or use an RFID badge or other item to automatically provide his or her user information. In addition or alternatively, the user may identify a class of drivers to which the user belongs. Once the vehicle has identified the driver, the vehicle may enter into a mode that is specific to that driver or class of driver.

Each driver of a vehicle may have his or her own driver profile. Profiles may describe the level of acceleration or impose other limitations on the user's operation of the vehicle. This allows for variable degrees of operation, or types of system functions, depending on the driver. Similarly, passengers may also have profiles. For example, once a passenger has been identified as described above, the vehicle may operate according to the passenger profile. The vehicle may further operate differently when the vehicle is full of children, or loaded (or overloaded) with particular cargo.

Restrictions may be based on the age or experience of the vehicle's operator. For example, a sixteen-year-old operator may have substantially more restrictions than a thirty-year-old experienced operator. In one example, a young driver may be subject to certain restrictions including limits on speed or locations regarding where the user may travel, how fast the vehicle may approach an intersection, or where the vehicle is located between lane lines or boundaries. Yet further, a new driver's freedom to operate the vehicle at may decrease at night, when the vehicle is near schools, about to enter high traffic areas, or otherwise enter a territory that may strain the experience of a new driver. Similarly, the vehicle may also be used to control the movements of drivers subject to legal restraints. For example, those convicted of certain crimes, such as endangering the welfare of a child, may be prevented from using the vehicle within a certain distance from a school or playground.

If the vehicle approaches an area restricted to the driver, the car may slow to a stop or prevent the driver from turning the vehicle into an area. Similarly, if the driver takes the vehicle into a restricted area, the vehicle may take control of speed and direction of the vehicle to maneuver away from the restricted area.

The vehicle may also allow certain drivers greater privileges with respect to operating the vehicle at fast speeds or taking other certain actions.

The identification system may be used to not only identify the driver, but also to identify the purpose of the drive. For example, a schoolteacher or other figure may use a badge to identify himself or herself to the computer before placing a child in the vehicle. If the badge or other user is not recognized, the vehicle may not permit the teacher to place the child in the vehicle, such as by not opening the doors. After the child has been placed in the vehicle, the vehicle may enter into a fully autonomous mode or one where the child may have limited control in order to transport the child to a destination. Once the vehicle has arrived at its destination, for example, the child's home, the vehicle may only unlock the doors when the parent, guardian, or other authorized user has submitted a badge or identified himself or herself to the vehicle.

A similar system may also be used to transport packages or other items. For example, the courier service may use the badge to open the vehicle, place a package in the vehicle, and input a destination and the identification of the recipient. In response, the vehicle may enter a fully autonomous mode and transport the package to the destination. Once the vehicle has arrived, it may wait for the recipient to identify him or herself before opening and relinquishing the package. In another example, the vehicle may be sent to pick up food from a restaurant or groceries from a market in a similar manner.

The vehicle may also be used to train and test drivers. For example, the vehicle may be used to instruct new drivers in the real world, but may control various aspects of the ride in order to protect the new driver, people external to the car, and external objects. In another example, new drivers may be required to control the vehicle safely for some period. The vehicle may then determine whether the user is a safe driver and thus determine whether the user is ready to be a licensed driver.

The vehicle may also have additional user interfaces designed or augmented for safety. For example, the steering wheel may be configured to be stiffer when the steering wheel or computer detects that the driver is moving the vehicle into another lane without a turn signal. This may prevent sudden jerks or movements of the vehicle. Drivers generally use small movements of the steering wheel to maintain position within a lane, and thus the computer may disregard these movements and maintain the position with the lane independently from the driver's steering. Similarly, moving the wheel somewhat harder to the left may signal a lane change to the computer. If the computer determines that there are no obstacles and the roadway allows for this movement, the vehicle may respond to the hard turn of the steering wheel by changing lanes. In that regard, turning the steering wheel may not indicate the orientation of the front wheels, but rather the user's desire to take a certain action. In response, the computer may handle the requirements associated with moving the vehicle into another lane.

The acceleration or deceleration pedals may also be reconfigured to increase safety. For example, if the vehicle has identified the speed limit of the roadway, the driver's full depression of the accelerator may be interpreted as an indication that the driver wants to drive at the posted speed limit or some other pre-determined limit. It may also indicate that the car should navigate turns at the highest speed that is safest for the turn. Yet further, a young driver may be limited to 20 miles per hour where the posted speed limit is 25 miles per hour or 15 miles per hour in an emergency construction zone. In this regard, the driver's effect on the acceleration and deceleration of the vehicle may be controlled based on the computer's identification of who is driving and the objects or obstacles that are within the surrounding environment.

In another example, the vehicle may use the windshield or an electronic display to display information unrelated to the vehicle, such as email, during a fully autonomous mode. If the computer determines that the driver's assistance is needed, the vehicle may turn the display off and flash a warning to the driver such as "you need to pay attention right now in case I need you." For example, the information unrelated to driving may be turned off if roadway information becomes unavailable, or if traffic has been reconfigured around an accident.

The vehicle may also park itself. For example, the map information may include data describing the location of parking spots along a roadway or in a parking lot. The computer may also be configured to use its sensors to determine potential parking spots, such as causing the vehicle to travel down a road and checking for painted lines along a street that indicate an open parking space. If computer determines another vehicle or object is not within the spot, the computer may maneuver the vehicle into the parking spot by controlling the steering and speed of the vehicle. Using the method described above, the vehicle may also classify any objects that are near the potential parking spot, and position the vehicle within the parking spot based on those surrounding objects. For example, the vehicle may position itself closer to an adjacent bicycle than it would an adjacent truck.

The vehicle may also have one or more user interfaces that allow the driver to reflect the driver's driving a style. For example, the vehicle may include a dial which controls the level of risk or aggressiveness with which a driver would like the computer to use when controlling the vehicle. For example, a more aggressive driver may want to change lanes more often to pass cars, drive in the left lane on a highway, maneuver the vehicle closer to the surrounding vehicles, and drive faster than less aggressive drivers. A less aggressive driver may prefer for the vehicle to take more conservative actions, such as somewhat at or below the speed limit, avoiding congested highways, or avoiding populated areas in order to increase the level of safety. By manipulating the dial, the thresholds used by the computer to calculate whether to pass another car, drive closer to other vehicles, increase speed and the like may change. In other words, changing the dial may affect a number of different settings used by the computer during its decision making processes. A driver may also be permitted, via the user interface 225, to change individual settings that relate to the driver's preferences. In one embodiment, insurance rates for the driver or vehicle may be based on the style of the driving selected by the driver.

Aggressiveness settings may also be modified to reflect the type of vehicle and its passengers and cargo. For example, if an autonomous truck is transporting dangerous cargo (e.g., chemicals or flammable liquids), its aggressiveness settings may be less aggressive than a car carrying a single driver—even if the aggressive dials of both such a truck and car are set to "high." Moreover, trucks traveling across long distances over narrow, unpaved, rugged or icy terrain or vehicles may be placed in a more conservative mode in order reduce the likelihood of a collision or other incident.

In another example, the vehicle may include sport and non-sport modes which the user may select or deselect in order to change the aggressiveness of the ride. By way of example, while in "sport mode", the vehicle may navigate through turns at the maximum speed that is safe, whereas in "non-sport mode", the vehicle may navigate through turns at the maximum speed which results in g-forces that are relatively imperceptible by the passengers in the car.

The vehicle's characteristics may also be adjusted based on whether the driver or the computer is in control of the vehicle. For example, when a person is driving manually the suspension may be made fairly stiff so that the person may "feel" the road and thus drive more responsively or comfortably, while, when the computer is driving, the suspension may be made such softer so as to save energy and make for a more comfortable ride for passengers.

The driver may also train the vehicle to the driver's specific style. For example, the vehicle may include a "record" button to put the vehicle into a training mode to record the actions of the driver. The driver may drive the vehicle for a day while the vehicle monitors how much torque is applied to the steering wheel, how quickly the driver accelerates at an interaction or highway, whether the driver selects to change lanes and pass slower vehicles, and how the driver applies the brakes. The vehicle may then identify the driver's preferred style and replicate this style when the driver uses the vehicle in an autonomous mode.

The record button may also be used to record a specific route that the driver follows each day as well as the driver's style during the route. Then, the driver may select a "play" button and replay the route on the user display. Alternatively, the driver may select a "repeat trip" button, causing the vehicle to follow the same route making similar choices, though making alterations as necessary for safety, as the driver had done during the recording mode.

The vehicle may include a sleeping mode that allows the driver to give full control of the vehicle to the computer so that the driver may sleep or reduce his or her focus on the roadway. For example, the vehicle may include a user input device that allows the user to input information such as the duration of the sleep mode, e.g., 20 minutes, 4 hours, 8 hours, etc. In response, the vehicle may drive slower or on less traveled roadways, select a route that will get the driver to the destination in the identified period, or select a route which that avoid bumps or other disturbances to the driver.

If the duration of the sleep mode is greater than the estimated amount of time that it will take for the vehicle to arrive at the destination, the vehicle may park itself at some point along the route in order to arrive at the destination at the end of sleep mode. Alternatively, the vehicle may proceed to the destination without stopping, and use audible or tactile cues to wake the driver after the identified period had passed. Such cues may also be activated if the duration of the sleep mode ended prior to the vehicle arriving at the destination.

The driver may also select to have his or her vehicle communicate with other devices. As shown in FIG. 7, vehicle 101 may communicate over a network 720 with devices such as a remote server 710, a personal computer 730, a mobile device 740, or another autonomous vehicle 702. In addition, vehicles, such as vehicle 701 and vehicle 702, may wirelessly transmit information directly to nearby vehicles using radio, cellular, optical or other wireless signals. Alternatively, vehicles may communicate with each via nodes that are shared among multiple vehicles, e.g., by using cell towers to call other cars or transmit and send information to other cars via the Internet.

The transmitted information between vehicles may include, for example, data describing the vehicle or the vehicle's environment.

In one example, a driver of a first vehicle may select an option to allow other vehicles on the roadway to transmit information from the vehicle's sensors or computer. This information may include details about the first vehicle's environment such as detected objects, traffic conditions, or construction. The information transmitted to other vehicles may be sensor data unprocessed by the first computer or information previously processed by the first computer in order to reduce the time needed to obtain and process the information at a second vehicle. If the second autonomous vehicle is behind the first vehicle, it may use the information to determine how to maneuver the vehicle. By way of example, if the first vehicle is only a few car lengths in front of the second vehicle and it detects a moving object, the first vehicle may transmit information relating to the moving object to the second vehicle. If the second vehicle determines that the object is moving towards the second vehicle's path, the second vehicle may slow down. Yet further, if the second vehicle is a few miles behind the first vehicle and the first vehicle determines that it is in a traffic jam (e.g., by determining that its speed is substantially less than the road's speed limit), the second vehicle may select an alternate route.

The driver of the first vehicle may also select to share information regarding the operation of the vehicle to other vehicles. For example, a second vehicle may also receive information indicating that the first vehicle's traction control has been activated around a turn and in response, the second vehicle may take the same turn at a slower speed. In another example, if the first vehicle has taken an evasive action, such as swerving to avoid a deer, a second vehicle may react by slowing down or taking some other evasive action to avoid the likelihood of a collision.

In addition to sharing information, the driver may also select to have the vehicle act cooperatively with other autonomous vehicles. The cooperation may be controlled at least in part by the vehicle's collective computers, a single one of the cooperating computers, or by a remote server to which the cooperating computers relinquish control.

For example, two or more cooperating vehicles may travel together in a line such that one vehicle follows closely behind the others for various distances sharing information and synchronizing speeds so that the following vehicle may draft behind the leading vehicle; such actions may preserve fuel and increase the flow of traffic. The cooperating vehicles may travel one in front of the other, as a line of two or more vehicles. The first vehicle in a line may reduce the amount of wind resistance on the other the vehicles in the line and may increase the fuel efficiency of the other vehicles. The first vehicle may be rotated, for example by exiting the first vehicle from the line, slowing the vehicle down, and reentering at the end of the line. This may allow for greater distribution of the fuel costs along the line. The line may allow a large number of vehicles to travel at fast speeds with only a few feet or inches between the vehicles, thus reducing the amount of space needed for a line of vehicles and increasing the flow of traffic. This cooperating may also be used to increase the flow of traffic by reducing the amount of sporadic braking by drivers during heavy traffic conditions.

For example, a vehicle approaching a line may transmit a signal to the vehicles of the line indicating the approaching vehicle's intention to join the line. If the approaching vehicle is alongside the line, some of the vehicles may slow down slightly to open a gap in the line. The approaching vehicle may join the line, and the vehicles may speed up slightly to close the gap. When a vehicle is ready to leave the line, for example to use an exit, a second signal is transmitted, and the line responds by opening a gap around the leaving vehicle. Once the leaving vehicle has left the line, the line may again close the gap.

The line described above may be a service offered to drivers for a fee. For example, the driver of a vehicle wishing to join the line may be required to pay the other drivers or the train or some other service before joining.

In addition to cooperatively driving together in lines, autonomous vehicles may also communicate in order to increase convenience and safety on the roadways. For example, autonomous vehicles may be able to double (two vehicles in a row) and triple park (three vehicles in a row) next to other autonomous vehicles. When a driver would like to use a vehicle which is parked in or surrounded by other autonomous vehicles, the driver's vehicle may send a signal instruction the other vehicles to move out of the way. The vehicles may respond by cooperatively maneuvering to another location in order to allow the driver's vehicle to exit and may return to park again.

In another example, the cooperation mode may be used to promote smarter road crossings. For example, if several autonomous vehicles are approaching and intersection, the right-of-way problem, or which vehicle should be next to enter the intersection, may be calculated and determined cooperatively among the several vehicles. In another example, traffic signals may change quickly, such as within only a few seconds or less, to allow more vehicles to pass through an intersection in multiple directions. The vehicle may only need the traffic signal to be green for a second or less in order to pass through the intersection at high speeds.

Vehicle 101 may also receive updated map or object data via network 720. For example, server 710 may provide vehicle 101 with new data relating to object classifications and behavior model information. Computer system 110, of FIG. 1, may then be updated, and the new data may be used in controlling the vehicle autonomously, such as through implementation of flow diagram 600.

In addition to the sensors described above, the vehicle may also include various other sensors in order to increase the perceptive abilities of the vehicle. For example, thermal imaging sensors may be used to identify the heat of pedestrians, animals, or vehicles. In another example, detecting the rigidity of certain objects is generally difficult, however using near infra-red sensors may be used to detect to give the computer additional cues. Sensors may also be used to detect the conditions of the road surface, such as icy or wet. These sensors may be included, for example, in the tires or wheels. Wind resistance sensors, placed for example on each of the lateral sides of the vehicle, may be used to increase fuel efficiency by allowing the computer to adjust the course of the vehicle.

Sensors may also be incorporated into the interior of the vehicle in order to sense information about any occupants. Sensors may be used to identify the state of the driver's eyes, breathing, temperature, or heart rate to determine whether the driver is sleeping, temporarily distracted, etc. Using the data collected from these sensors, the vehicle may change its operation. For example, the vehicle may determine that the driver has fallen asleep or passed out and take control in order to avoid a collision such as by slowing or parking the vehicle. In other examples, breath sensors or sensors which detect eye movements may be used to determine whether the driver is intoxicated, and if so, the vehicle may prevent the driver from taking control but not from using the vehicle to drive home or to a hospital.

As these number and usage of these autonomous vehicles increases, various sensors and features may be incorporated into the environment to increase the perception of the vehicle. For example, low-cost beacon transmitters may be placed on road signs, traffic signals, roads or other highway infrastructure components in order to improve the computer's ability to recognize these objects, their meaning, and state. Similarly, these features may also be used to provide additional information to the vehicle and driver such as, whether the driver is approaching a school or construction zone. In another example, magnets, RFID tags or other such items may be placed in the roadway to delineate the location of lanes, to identify the ground speed vehicle, or increase the accuracy of the computer's location determination of the vehicle.

In other examples, autonomous vehicles may be given certain privileges on the roadway. For example, special lanes may be designated for autonomous vehicles traveling in lines so that they may travel at faster speeds. In another example, certain geographic areas may be designated as autonomous vehicle-only zones.

These vehicles may also be used to assist law enforcement. For example, an autonomous vehicle may be controlled by a remote driver in hostile situations or areas in order to reduce the risk of injury or death to the driver. In another example, autonomous vehicles may be used to assist law enforcement officers while on patrol by controlling the vehicle in order to allow the officer to focus on looking around, running license plates, or using the radio rather than driving. A patrolling vehicle may also have a pre-determined route in order to increase the efficiency of patrolling. If needed, the driver may take control in order to take the vehicle off of the route. The patrolling vehicle may also inform the driver if any areas of the pre-determined route have been skipped. In addition, the driver may also receive processed sensor data from the computer in order to increase the driver's perception of the environment.

These vehicles may also be used to assist law enforcement with dangerous drivers. During dangerous high-speed chases, the vehicle may allow autonomous law enforcement vehicles to maintain high speeds in confined situations, such as through areas of high traffic, while at the same time reducing the likelihood of a collision with environmental objects. In another example, autonomous law enforcement vehicles or other autonomous vehicles may voluntarily block in a dangerous driver or adjust the vehicles' formation to prevent dangerous maneuvers until law enforcement vehicles arrive. Autonomous vehicles may also keep passengers away from other humans or vehicles (autonomous or not) behaving dangerously, for example, a swerving or speeding vehicle or distracted a driver talking on a mobile phone.

In case of an emergency, autonomous law enforcement vehicles such as patrol vehicles, fire trucks, or ambulances may be given a limited amount of control over nearby vehicles. For example, these autonomous emergency vehicles may transmit a signal causing other autonomous vehicles to turn off certain features or maneuver out of the way in order to allow the emergency vehicle to pass safely. In another example, law enforcement may be able to take control of a vehicle at a construction zone or accident scene in order to send the vehicle through quickly while again reducing the likelihood of a collision. Emergency vehicles may also be able to control the directionality of a lane, such as by temporarily changing the direction of a one-way street or changing a right-turn-only lane to a lane through an intersection.

Autonomous vehicles may also be controlled remotely. For example, if the driver is asleep, the sensor data may be sent to a third party so that vehicle may continue to have a responsive operator. While delay and latency may make this type of telemetry driving difficult, it may for example be used in emergency situations or where the vehicle has gotten itself stuck. The vehicle may send data and images to a central office and allow a third party to remotely drive the vehicle for a short period until the emergency has passed or the vehicle is no longer stuck.

These vehicles may also be subject to zoning rules. For example, where the vehicle enters a pre-designated "autonomous zone," such as an airport, an airport control service may take control of the vehicle, deliver it to a specified loading or unloading location, and park the vehicle. This may allow the airport service controlling the vehicle to limit the number of vehicles in a given area, such as a passenger loading or unloading zone at an airport, or to decrease the likelihood of a collision in a high trafficked area. In another example, some zones may require that the driver take complete control of the vehicle. A complicated traffic circle may send a signal indicating that vehicles cannot be driving in an autonomous mode and thus require that the driver take control.

Different zones may also have different access levels. For example, as mentioned above, younger drivers may be prohibited from accessing certain areas. Other zones may be prohibited to all but law enforcement officers or employees of a business. In another example, zones may also have speed or vehicle occupancy (carpooling) requirements.

Autonomous vehicles may be configured differently than current non-autonomous vehicles. For example, current vehicles may be considerably heavier than necessary in order to increase the effectiveness of safety features or may have stiffer suspensions and larger engines to increase performance and handling. Autonomous vehicles may be built to be smaller and lighter with softer suspensions and smaller engines. This may allow autonomous vehicles to be much more compact and efficient in terms of fuel economy than non-autonomous vehicles.

These vehicles may also have various seating and control arrangements. For example, the vehicle may include a sleeping surface to allow the driver to lie down and sleep while the vehicle is in control. The seating within the vehicle may be arranged so that the driver and passengers may face one another. Televisions or web browsers, and other customer media may be incorporated in order to increase available activities and passenger comfort levels. The vehicle controls may be distributed throughout the vehicle so that each passenger may control the vehicle if necessary. The distributed controls may require that the driver have the ability to have complete control, but the remaining passengers may only be able to steer, slow or stop the vehicle. The distributed controls may also have a locking mode in order to prevent certain passengers from having any control over the vehicle.

The vehicle may also be made to change shape based on its use. For example, when not in use or when in a parking mode which requires the vehicle to continue driving, the vehicle may collapse (e.g., the roof may fold down). This may reduce the volume of the vehicle and allow other drivers to see past or over the vehicle. The reduced volume may also allow the vehicle to be more portable and efficient.

The vehicle may also drive itself to optimize its longevity and reduce wear of the various components. For example, the vehicle may operate the brakes gradually whenever able in order to reduce wear on the tires and brakes or accelerate slowly in order to reduce wear on the tires. A vehicle may also adjust suspension, torque or horsepower settings based on the conditions of the roadway (icy, wet, smooth, rocky or bumpy, lots of potholes, etc.). In another example, electric autonomous vehicles may drive themselves to a recharging station to charge one or more batteries when not in use by a human operator, or fueled vehicles may drive themselves to refueling stations on their own. Vehicles with trailers may detect and correct for trailer oscillations and changes in the weight or maneuverability of a trailer in order to increase performance and smoothness of the ride.

The vehicle may also diagnose problems and take one or more actions in order to prevent further damage or remedy any problems. For example, the vehicle may monitor the performance of various components such as the engine, brakes or tires. If there is an emergency, such as if coolant is leaking and the engine is at risk of overheating, the computer may stop the vehicle immediately to avoid any further damage. If there appears to be a less imminent problem, such as a tire slowly leaking or the vehicle's components are worn to some pre-determined level, the vehicle may schedule and transport itself to the manufacturer or a repair shop for maintenance. In one example, the vehicle may determine that the oil needs to be changed, schedule an appointment, and take itself for the oil change. In another example, the vehicle may test itself by driving short or large distances in order to diagnose problems. Vehicles may also detect and self-correct minor problems such as incorrect wheel alignment or tire pressure. A fleet vehicle may diagnose and report problems or variations among the other vehicles of the fleet.

These vehicles may produce data which may benefit non-drivers. For example, advertisers or businesses may pay a fee for information regarding how often vehicles arrive at a business location or how often vehicles make u-turns before arriving at the business location. A fueling station operator may want to know how many vehicles drive by a location during a particular period, the fuel levels of the vehicles, and decide whether the location would be a profitable location for a fueling station.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising:
controlling a vehicle according to a first control strategy, the first control strategy determined based on a route to a destination;
detecting an object external to the vehicle using one or more sensors;
using a processor, determining a classification and a state of the detected object;
determining a current location of the vehicle;
accessing behavior data for other objects having the same or similar classifications and states as the detected object, the behavior data indicating how the other objects have operated at the current location at one or more previous times;
predicting a likely behavior of the detected object at the current location based on the behavior data for the other objects having the same or similar classification and state as the detected object; and
modifying the first control strategy to obtain a second control strategy for controlling the vehicle based on the predicted likely behavior of the detected object.

2. The method of claim 1, wherein the classification of the detected object includes one of an automobile, a pedestrian, structure, or a bicycle.

3. The method of claim 1, wherein the detected object is an automobile, and wherein the classification of the detected object includes the type of automobile.

4. The method of claim 1, wherein the determining a classification of the detected object is based on identifying at least one of a logo, a bumper sticker, or a license plate.

5. The method of claim 1, wherein the state of the detected object relates to at least one of: location, traffic lane in which the detected object is traveling, speed, acceleration, entry onto a road, exit off of a road, activation of headlights, activation of taillights, or activation of blinkers.

6. The method of claim 1, wherein the behavior data is based on movement data for a plurality of other objects at one or more locations.

7. The method of claim 6, wherein the movement data are tracked using one of: satellite imagery, roadside cameras, on-board GPS data, or sensor data acquired for other nearby vehicles.

8. The method of claim 1, wherein:
implementing the second control strategy comprises providing a command to orient the vehicle in a position and velocity based at least in part on the likely behavior of the detected object; and
providing the command to orient the vehicle includes positioning the vehicle at a predetermined distance from the detected object, the predetermined distance being based, at least in part, on the classification of the detected object.

9. The method of claim 1, wherein the likely behavior of the detected object is provided as a probability of the detected object entering to one or more states.

10. The method of claim 1, further comprising:
receiving updated behavior data; and
wherein predicting the likely behavior of the detected object is based at least in part on the updated behavior data.

11. The method of claim 10, wherein receiving the updated behavior data comprises accessing a remote server.

12. A system comprising:
one or more sensors for detecting an object in a vehicle's surroundings; and
a processor coupled to the one or more sensors, the processor being operable to:
control operation of the vehicle based on a first control strategy, wherein the first control strategy is determined based on a route to a destination;
determine a classification and a state of a detected object;
determine a current location of the vehicle;
access behavior data for other objects having the same or similar classifications and states similar as the detected object, the behavior data indicating how the other objects have operated at the current location at one or more previous times;
predict a likely behavior of the detected object at the current location based on the behavior data for the other objects having the same or similar classification and state as the detected object; and
modify the first control strategy to obtain a second control strategy for controlling the vehicle based on the predicted likely behavior of the detected object.

13. The system of claim 12, wherein the classification of the detected object includes classifying the detected object as one of: an automobile, a pedestrian, a bicycle, or a structure.

14. The system of claim 12, wherein the detected object is an automobile, and wherein the classification of the detected object includes identifying the type of automobile.

15. The system of claim 12, wherein the classification of the detected object is based on at least one of: a logo, a bumper sticker, or a license plate.

16. The system of claim 12, wherein the state of the detected object relates to at least one of: location, traffic lane in which the detected object is traveling, speed, acceleration, entry onto a road, exit off of a road, activation of headlights, activation of taillights, or activation of blinkers.

17. The system of claim 12, wherein the behavior data represents information regarding the states of the other objects that have been tracked at one or more locations.

18. The system of claim 17, wherein the objects have been tracked using at least one of: satellite imagery, roadside cameras, on-board GPS data, or via sensor data acquired from other nearby entities.

19. The system of claim 12, wherein the second control strategy includes positioning the vehicle at a predetermined distance from the detected object, the predetermined distance being based, at least in part, on the classification of the detected object.

20. The system of claim 12, wherein the likely behavior of the detected object is provided as a probability of the detected object entering to one or more states.

21. The system of claim 12,
wherein the processor is further operable to access updated behavior data; and
wherein the likely behavior of the detected object is based at least in part on the updated behavior data.

22. The system of claim 21, wherein the vehicle receives the updated behavior data from a remote server.

23. A method for providing data in connection with controlling of a vehicle, the method comprising:
storing, at a server, behavior data for a plurality of objects, wherein the behavior data includes classification and state information for at least a subset of the plurality of objects at one or more locations and at one or more times;

receiving identification data from a remote device, wherein the identification data includes data relating to a detected object near the remote device;

receiving a location of the detected object;

determining, at the server, the classification and state of the detected object;

predicting a likely behavior of the detected object based on the behavior data for the plurality of objects having a classification and state similar to the detected object for the location where the detected object was detected and the time when the detected object was detected;

transmitting the likely behavior of the detected object to the remote device.

* * * * *